United States Patent Office.

JOHN PICKLES, OF WIGAN, ENGLAND.

Letters Patent No. 91,480, dated June 15, 1869.

---

IMPROVEMENT IN THE MANUFACTURE OF PAPER.

---

The Schedule referred to in these Letters Patent and making part of the same.

---

*To all whom it may concern:*

Be it known that I, JOHN PICKLES, of Wigan, county of Lancaster, England, in the United Kingdom of Great Britain and Ireland, engineer, have invented a new and useful composition of matter obtained from the wild and cultivated rice-plant, for the Manufacture of Paper, or paper-stock; and I do hereby declare that the following is a full and exact description thereof.

The nature of my invention consists in making stock for the manufacture of paper, from the fibres obtained from the leaves, stalks, and roots of the wild and cultivated rice-plant, a cereal grass, known by the botanical name, "*Oryza.*"

The plant may be cut into short lengths, or may be placed whole in an open or closed boiler or vessel.

After the boiler or vessel is charged with the plant, I then introduce into the boiler or vessel a sufficient quantity of lime-water, or the milk of lime, to cover the plant under treatment.

Fire, or steam-heat, is then applied to the boiler or vessel, and its contents, for from three to five hours, at the end of which time it will be found that the plant has been reduced to a pulpy condition, and the fibres separated from the other component parts. I then remove the contents of the boiler or vessel.

I prefer, in all cases, to use lime-water, or the milk of lime, as I have found, by experiments, that to use an alkali of the strength used in reducing other fibrous vegetable matter, such as straw, &c., which registers 2° and upward, Baumé, destroys the fibres of the rice-plant.

Having thus described my invention,

What I claim as new, and desire to secure by Letters Patent, is—

The manufacture of paper-pulp, from the materials and by the process substantially as herein described.

To the above, I have signed my name, this 12th day of February, 1869.

JOHN PICKLES.

Witnesses:
   JNO. NICHOLLS,
   WM. F. LIGHTHALL.